United States Patent [19]

Freudenschuss

[11] 4,113,382
[45] Sep. 12, 1978

[54] METHOD OF AND SYSTEM FOR MEASURING DISTANCES

[75] Inventor: Otto Freudenschuss, Vienna, Austria

[73] Assignees: Karl Vockenhuber; Raimund Hauser, both of Vienna, Austria

[21] Appl. No.: 749,333

[22] Filed: Dec. 10, 1976

[30] Foreign Application Priority Data

Dec. 12, 1975 [AT] Austria .................................. 9443/75

[51] Int. Cl.² ............................ G01C 3/08; G01S 9/56
[52] U.S. Cl. ...................................... 356/5; 343/6.5 R; 356/28
[58] Field of Search .................................. 356/4, 5, 28; 343/6.5 R, 17.7

[56] References Cited

U.S. PATENT DOCUMENTS

| | | | |
|---|---|---|---|
| 3,780,370 | 12/1973 | Reeves | 343/17.7 |
| 3,945,006 | 3/1976 | Cleeton | 343/6.5 R |
| 4,026,654 | 5/1977 | Beaurain | 356/5 |

Primary Examiner—S. C. Buczinski
Attorney, Agent, or Firm—Montague & Ross

[57] ABSTRACT

To measure the distance between a master station at a first location and a slave station at a second location, an interrogation pulse — e.g. of light — sent out by a transmitter at the master station is intercepted by a receiver at the slave station and, after a delay period T, triggers a transmitter at the latter station to send back a reply pulse to a receiver at the master station. The reply pulse starts another delay period T at the slave station, followed by the emission of a follow-up pulse. At the master station, the duration of the delay period T — as measured from the arrival of the reply pulse to that of the follow-up pulse — is deducted from the time measured between the emission of the interrogation pulse and the reception of the reply pulse to give an indication of the distance between the stations. Since this indication is independent of T, the delay period may be made variable to serve as a gauge for some other quantity such as the speed of a vehicle carrying the slave station.

5 Claims, 3 Drawing Figures

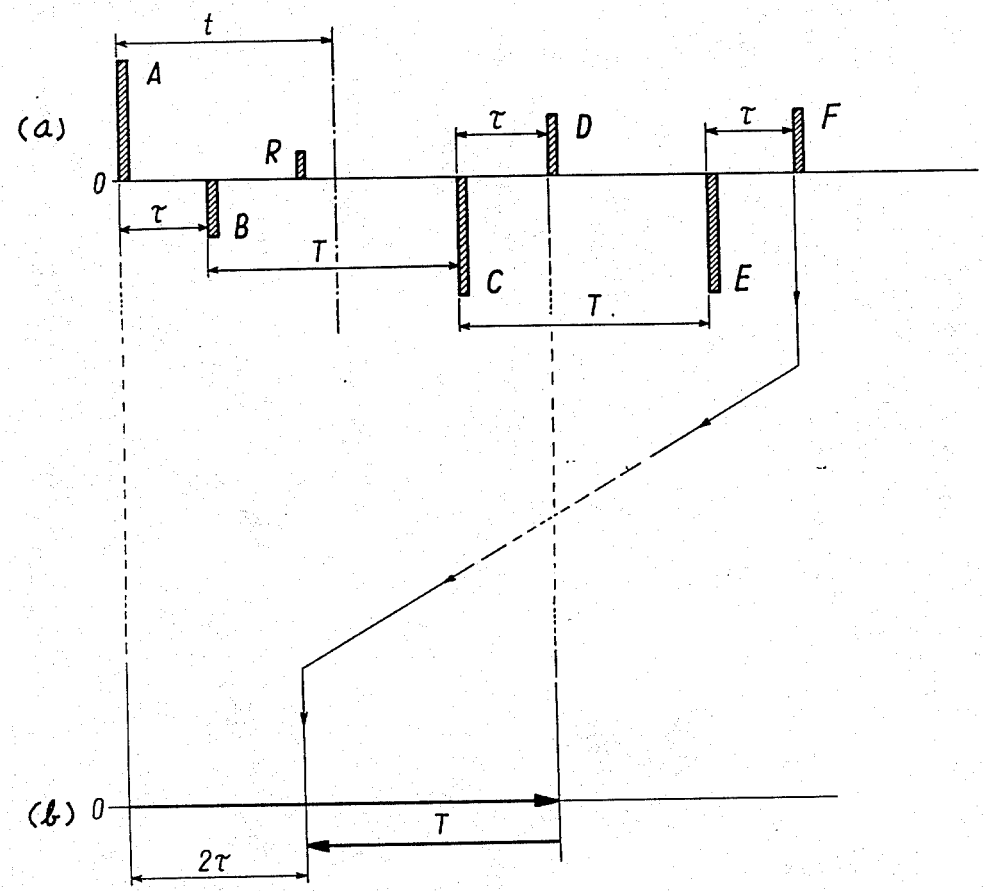

METHOD OF AND SYSTEM FOR MEASURING DISTANCES

FIELD OF THE INVENTION

My present invention relates to a method of and a system for measuring the distance between a first location, referred to hereinafter as a master station, and a second location, referred to hereinafter as a slave station, by determining the transit time of a pulse of luminous or electromagnetic radiation between the two locations.

BACKGROUND OF THE INVENTION

In a system of this type, used for example in determining the distance of a vehicle from an observation point, it is known to provide the master station with a first pulse transmitter for sending an interrogation pulse to the slave station and with a first pulse receiver for intercepting a reply pulse sent back from the slave station. The latter, in turn, comprises a second pulse receiver for intercepting the interrogation pulse and a second pulse transmitter triggerable by the second pulse receiver, with a certain delay, for emitting the reply pulse. The delay, of predetermined duration, is designed to prevent interferences between the trailing end of the interrogation pulse arriving at the slave station and the leading end of the outgoing reply pulse. At the master station, this delay is taken into account by starting the measurement of the transit time between the two stations only after timing a like delay from the emission of the interrogation pulse; this latter delay serves to provide a guard interval during which the receiver of the master station may be made insensitive to incoming pulses which could be spurious reflections from nearby objects. An accurate determination of distance requires, of course, that the delay introduced at the slave station be practically constant and that its magnitude be precisely known at the master station.

In practice, however, deviations from the presumed duration of the delay period frequently occur for various reasons including ambient conditions such as temperature, aging of components, or manufacturing tolerances.

OBJECTS OF THE INVENTION

The general object of my present invention, therefore, is to provide a method of and means for eliminating this source of error in a distance-measuring system of the type referred to.

A related object is to make distance measurement in such a system independent of the actual delay period whereby that period can be modulated to serve as a carrier of ancillary information such as, for example, the velocity of a moving vehicle carrying the slave station.

SUMMARY OF THE INVENTION

Pursuant to my present invention, the second pulse transmitter at the slave station sends out not only the aforementioned reply pulse but also a subsequent follow-up pulse, the two pulses being separated from each other by a period T which equals the delay intervening between the reception of the interrogation pulse and the emission of the reply pulse. Thus, the time elapsing from the arrival of the reply pulse at the master station to the reception of the follow-up pulse is exactly equal to the delay period T which must be deducted from the interval separating the emission of the interrogation pulse from the reception of the reply pulse in order to yield the two-way transit time $2\tau$, that transit time being proportional to the distance being measured.

Pursuant to another aspect of my invention, the follow-up pulse is generated by a pulse-replicating unit advantageously forming part of a feedback circuit of the second pulse transmitter, this feedback circuit including the same component that establishes the delay T which intervenes between the arrival of the interrogation pulse and the emission of the reply pulse. In this way, any change in the characteristics of that component will equally affect the two immediately consecutive delay periods T so as to allow exact compensation of that delay at the master station with the aid of suitable timing means which may comprise a reversible pulse counter. Because of the closeness in time of these two delay periods, the aforementioned error sources will not significantly alter their duration from the first occurrence to the second one.

In accordance with another feature of my invention, the component establishing the delay period T is adjustable to facilitate a modulation of that period under the control of a suitable signal generator such as, for example, a tachometer measuring the speed of a moving vehicle equipped with the slave station. The duration of period T can then be timed at the master station, e.g. by another pulse counter stepped in parallel with the aforementioned reversible counter from a source of clock pulses. Such a system could be used, for example, for traffic-control purposes by determining the relative distances and speeds of two or more vehicles moving along a common highway. Other possible uses include remote-control systems for the guidance of terrestrial, floating or airborne moving bodies, including military missiles.

BRIEF DESCRIPTION OF THE DRAWING

The above and other features of my invention will now be described in detail with reference to the accompanying drawing in which:

FIG. 3 is a timing diagram relating to the operation of the system.

SPECIFIC DESCRIPTION

Figure 1:
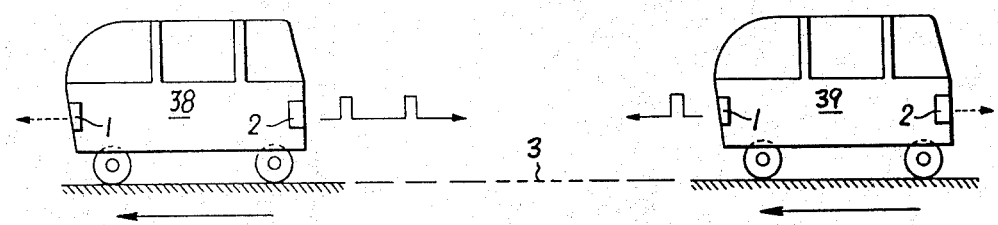
FIG. 1 is a schematic view of two codirectionally moving vehicles equipped with a system for measuring distances and speeds in accordance with my invention.

In FIG. 1 I have shown a pair of automotive vehicles 38 and 39 forming part of the traffic moving unidirectionally along a common highway 3, each vehicle carrying a master station 1 and a slave station 2 respectively oriented toward an immediately preceding and an immediately following vehicle. In the present instance it will be assumed that these vehicles are in sight of one another so that the exchange of pulse signals can be carried out optically.

Figure 2:
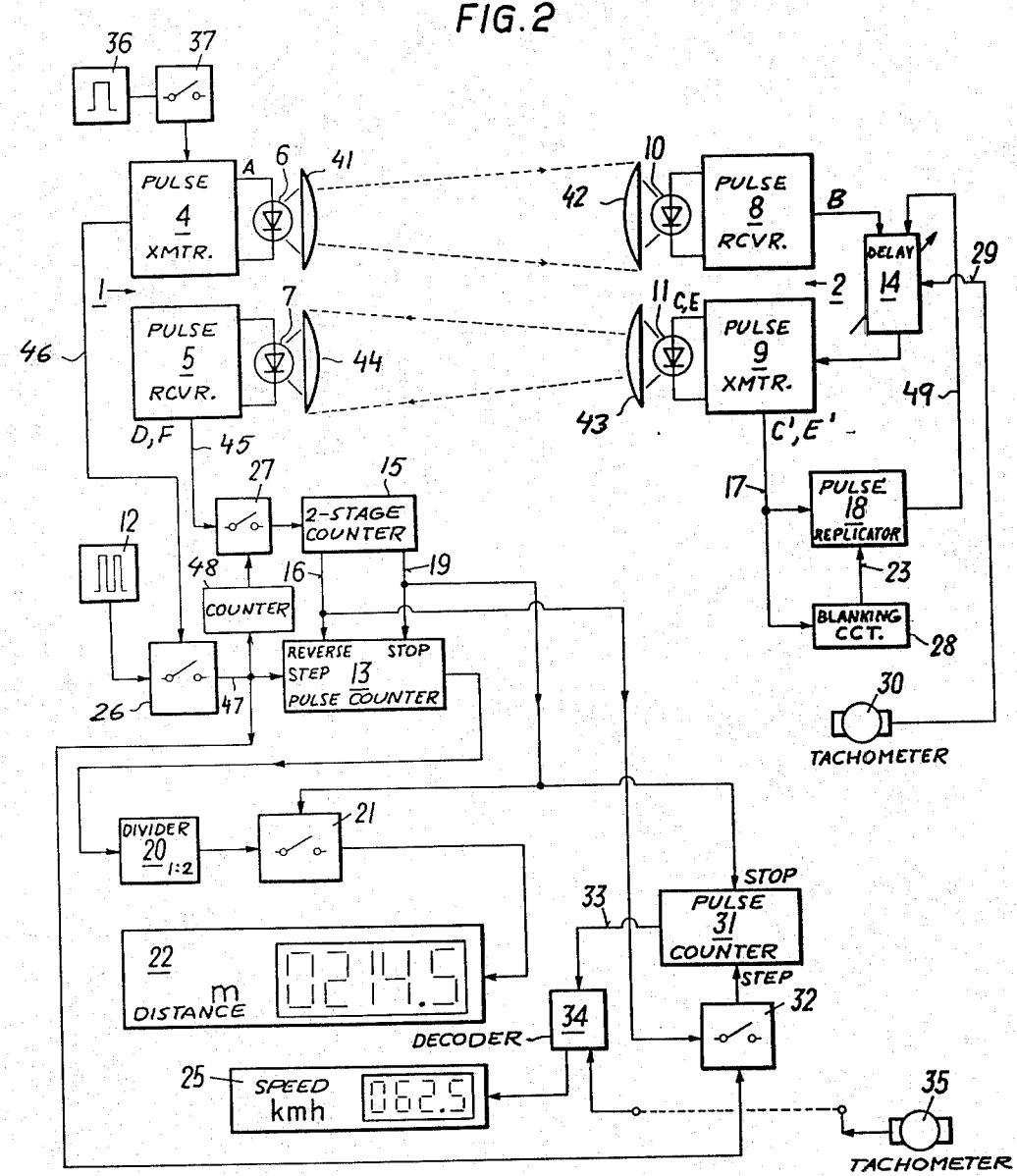
FIG. 2 is a block diagram of the measuring system carried aboard the vehicles of FIG. 1.

In FIG. 2 I have shown details of a master station 1 and a slave station 2 communicating with each other with the aid of light pulses, preferably in the infrared range. Station 1 comprises a pulse transmitter 4 sending out an interrogation pulse A via a light-emitting laser diode 6 and a beam-forming objective 41. This light pulse, whose leading edge occurs at an instant O, is intercepted at station 2 by an objective 42 to illuminate a photodiode 10 working into a pulse receiver 8 whose output is an electrical signal pulse B delayed with reference to pulse A by a transit time $\tau$ as illustrated in graph (a) of FIG. 3. Pulse B is fed via a delay network 14, retarding it by a period T, to an associated pulse transmitter 9 where it energizes a luminous diode 11 (similar to diode 6) associated with a beam-forming objective 43, thereby sending a reply pulse C back to station 1. The reply pulse is intercepted by an objective 44 working into a photodiode 7 which produces an electrical signal pulse D on an output lead 45 of a pulse receiver 5. Thus, the appearance of pulse D trails the emission of pulse A by an interval equal to $2\tau + T$ as seen in graphs (a) and (b) of FIG. 3. Simultaneously with the generation of outgoing pulse A, i.e. at time O, a timer in transmitter 4 energizes a lead 46 which closes an electronic switch 26 in an output lead 47 of a clock-pulse generator 12, the operating cycle of this generator being a fraction of the transit time $\tau$ for the shortest distance to be measured. Closure of switch 26, for an extended period outlasting the longest measuring interval $2T + 2\tau$, supplies the clock pulses to a stepping input of a reversible pulse counter 13 also having a reversing input and a stopping input, the two last-mentioned inputs being respectively connected to a pair of output leads 16 and 19 of a two-stage pulse counter 15. A stepping input of counter 15 is connected to output lead 45 of receiver 5 through the intermediary of an electronic switch 27 which is closed after a guard interval t, measured from time O, by the accumulation of a corresponding number of clock pulses in an ancillary counter 48 acting as a delay device. The guard interval t, as shown in graph (a) of FIG. 3, is less than the minimum timing interval $\tau + T$ and is designed to prevent premature actuation of counter 15 by spurious pulse reflections R from nearby objects. The guard interval is therefore substantially larger than the pulse width, as shown, and so is the delay T.

Interrogation pulse A originates at a pulse generator 36 which is shown connected to an input of transmitter 4 through a switch 37 adapted to be closed manually, for example, in order to carry out one or more measuring operations. Pulse generator 36 has a cadence much lower than that of generator 12 so that successive pulses A are separated by periods substantially greater than the maximum measuring interval $2T + 2\tau$ envisaged. At the instant O coinciding with the leading edge of any pulse A, generator 36 also resets the counters 13, 15 and 48 via nonillustrated connections. With switch 37 closed for prolonged periods, switch 26 could be closed continuously or omitted.

With ancillary counter 15 set to zero, the reversing input of counter 13 tied to lead 16 is not energized so that arriving clock pulses step this counter in a forward sense up to, let us say, a count of "846". With the arrival of signal pulse D, the energization of lead 16 reverses the sense of stepping so that subsequent clock pulses progressively diminish that count.

At the slave station 2, the emission of pulse C coincides with the appearance of a companion pulse C' on an output lead 17 of transmitter 9 from which a feedback path 49 extends back to that transmitter by way of a pulse replicator 18, e.g. an amplifier also acting as a pulse shaper, and the delay line 14. Thus, after another period T, transmitter 9 is again triggered to generate a follow-up pulse E exactly a period T after the generation of pulse C. At the master station this follow-up pulse appears in the output 45 of receiver 5 as a pulse F which again steps the counter 15, causing it to energize its output lead 19 in lieu of lead 16 to stop the counter 13. The final count, therefore, measures only the time $2\tau$ irrespective of delay T as will be apparent from graph (b) of FIG. 3.

In order to prevent the generation of more than one follow-up pulse in response to a single reply pulse, a blanking circuit 28 is triggerable by the pulses appearing on output lead 17 to disable the pulse replicator 18, for a period exceeding the maximum delay T, by applying a blocking voltage to a control input 23 thereof. Blanking circuit 28 may be a monoflop responsive to the trailing edge of pulse C'; though the companion pulse E' to follow-up pulse E will also reach the trigger input of that monoflop, this will have no effect since the monoflop will then still be in its off-normal state.

The reading of pulse counter 13 is fed via a divider 20, which halves the numerical value of the count, and by way of a switch 21 to an electroluminescent display device 22 which thus receives a numerical value equaling the number of clock pulses generated during transit time $\tau$. That value may be displayed directly or, as shown, upon conversion into units of length such as meters.

Naturally, divider 20 can be omitted if the factor of 2 is taken into account by the converter of indicator 22. Switch 21 is closed by the energization of output lead 19 of counter 15 and reopens, accordingly, upon the resetting of that counter.

Delay line 14 is shown to be adjustable so as to vary the duration of period T. Such variation is brought about by a control signal on a line 29 extending from a signal generator 30, here specifically a tachometer measuring the speed of the vehicle which carries the slave station 2. Through a suitable choice of circuit parameters, period T can be made proportional to speed whereby the number of clock pulses counted during that period is a gauge for the velocity of the vehicle. Another pulse counter 31 registers this number of clock pulses by having a stepping input connected to the output lead 47 of generator 12, downstream of switch 26, by way of another switch 32 which closes upon energization of lead 16; a stopping input of counter 31 is connected to lead 19 whereby this counter begins its advance upon the appearance of pulse D and ends it exactly a period T later, namely in response to pulse F. Counter 31 can likewise be periodically reset by generator 36. An output lead 33 of this counter extends to a decoder 34 which converts its reading into a numerical value fed to another display device 25 indicating speed in terms of kilometers per hour, for example.

As further shown in FIG. 2, a tachometer 35 at master station 1 may measure the speed of the vehicle carrying that station and feed it to decoder 34 as a numerical value subtracted from the reading of counter 31 so that indicator 25 displays only the relative speed of the two intercommunicating vehicles.

If no line-of-sight signaling between the two stations is possible, radio-frequency pulses may be used in lieu of light pulses. In such a system no delay period T need be provided for the purpose of preventing interferences, inasmuch as the slave station normally includes a transponder which changes the carrier frequency between the interrogation and reply pulses; nevertheless, the present invention will be useful also in that instance in view of the availability of the delay period as an information carrier concerning a variable other than distance. The variable in question need not necessarily be the velocity of a vehicle but might represent, instead, its degree of loading or its destination.

I claim:

1. A method of measuring the distance between a first location and a second location, comprising the steps of:
    sending an interrogation pulse from said first location to said second location;
    sending back a reply pulse from said second location to said first location after a delay T from the instant of arrival of said interrogation pulse at said second location;
    sending back a follow-up pulse from said second location to said first location after an equal delay T from the instant of emission of said reply pulse;
    determining, at said first location, the length of time elapsed between the emission of said interrogation pulse and the reception of said reply pulse;
    calculating a time $\tau$ proportional to the distance between said locations by deducting from said elapsed time the delay T as measured at said first location between the instants of arrival of said reply pulse and said follow-up pulse; and
    varying said delay T as a measure of another parameter whose magnitude is to be communicated from said second location to said first location.

2. A method as defined in claim 1 wherein said second location is aboard a moving vehicle, said delay T being varied in proportion to the speed of said vehicle.

3. A system for measuring the distance between a master station and a slave station, comprising:
    first pulse-transmitting means at said master station for sending an interrogation pulse to said slave station;
    first pulse-receiving means at said master station for intercepting a reply pulse sent back by said slave station;
    second pulse-receiving means at said slave station for interceptng said interrogation pulse;
    second pulse-transmitting means at said slave station triggerable by said second pulse-receiving means for emitting said reply pulse in response to the arrival of said interrogation pulse;
    delay means inserted between said second pulse-receiving means and said second pulse-transmitting means for retarding the emission of said reply pulse by a period T following arrival of said interrogation pulse;
    pulse-replicating means at said slave station connected to said second pulse-transmitting means for triggering the emission of a follow-up pulse separated from said reply pulse by said period T;
    timing means at said master station for determining a time $\tau$ proportional to the distance between said stations by measuring the interval from the emission of said interrogation pulse to the reception of said reply pulse and deducting from said interval the period T as measured between arrivals of said reply and follow-up pulse, said timing means including a source of clock pulses, a reversible pulse counter and switch means controlled by said first pulse-transmitting and pulse-receiving means for connecting said source to a stepping input of said pulse counter with reversal of the stepping direction in response to the arrival of said reply pulse; and
    indicator means connected to said timing means for giving said distance as a function of said time $\tau$.

4. A system for measuring the distance between a master station and a slave station, comprising:
    first pulse-transmitting means at said master station for sending an interrogation pulse to said slave station;
    first pulse-receiving means at said master station for intercepting a reply pulse sent back by said slave station;
    second pulse-receiving means at said slave station for intercepting said interrogation pulse;
    second pulse-transmitting means at said slave station triggerable by said second pulse-receiving means for emitting said reply pulse in response to the arrival of said interrogation pulse;
    delay means inserted between said second pulse-receiving means and said second pulse-transmitting means for retarding the emission of said reply pulse by a period T following arrival of said interrogation pulse;
    pulse-replication means at said slave station connected to said second pulse-transmitting means for triggering the emission of a follow-up pulse separated from said reply pulse by said period T;
    timing means at said master station for determining a time $\tau$ proportional to the distance between said stations by measuring the interval from the emission of said interrogation pulse to the reception of said reply pulse and deducting from said interval the period T as measured between arrivals of said reply and follow-up pulses;
    indicator means connected to said timing means for giving said distance as a function of said time $\tau$; and
    modulating means connected to said delay means for varying said period T as a function of a parameter to be communicated from said slave station to said master station, said timing means having an output providing a measure of said parameter derived from said period T.

5. A system as defined in claim 4 wherein said slave station is located aboard a vehicle, said modulating means including a tachometer measuring the speed of said vehicle as the parameter to be communicated to said master station.

* * * * *